Patented Dec. 1, 1942

2,303,740

UNITED STATES PATENT OFFICE 2,303,740

METHOD OF TREATING FISH AND FISH LIVERS AND RESULTING PRODUCT

Herbert Hempel, Essex, Mass., assignor to Gorton-Pew Fisheries Company, Ltd., Gloucester, Mass., a corporation of Massachusetts No Drawing. Application April 6, 1940, Serial No. 328,378

17 Claims. (Cl. 260—412.1)

This invention relates to the preservation and treatment of fish, and more particularly fish livers, for the recovery of oil therefrom, and resulting product.

In the fishing industry,—even though the fishing vessels are equipped with motors and thus enabled to make longer voyages with greater speed than ever before,—there is a considerable interval of time between the catching of the fish and the delivering of them on shore for food purposes or for further processing such as canning.

A common practice aboard fishing vessels is to clean the fish as soon as caught and lay them down on ice until the vessel returns to the dock for unloading. In doing so, the greater portion of the entrails are removed and thrown overboard. But some of the organs of the fish are separated and kept, and more particularly the livers, for the subsequent extraction of their oil content. These may be packed in kegs or other suitable containers and are delivered ashore to those who are properly equipped to carry out the necessary extraction process.

In the past, it has been successfully practiced simply to allow the mass of fish livers, as thus separated, to undergo spontaneous decomposition. This effects disruption of the tissues and cells and liberates the fish oils contained in and between them. Thereupon by boiling the mass in water the oil globules coalesce and rise to the top where they may be easily drawn off. But it is obvious that in such procedure the livers are subject to contamination by various kinds of bacteria and that each lot will undergo innumerable and unpredictable chemical reactions throughout such decomposition, with corresponding effects upon the oil itself as well as causing the introduction of various impurities, which the oils are well known to absorb actively and retain tenaciously against subsequent elimination.

A generally poor and always doubtful product is accordingly obtained by such procedures.

Other processes have been advanced for the treatment of livers in whatever condition they may be received.

Thus, it has been suggested to treat livers with sodium hydroxide solution, thereby to disintegrate the tissues and liberate the oil. But sodium hydroxide solutions will also saponify and thus destroy the oil. Accordingly, in carrying out such procedure it is recommended that by adjusting the amount of sodium hydroxide used, the oil may be liberated and the degree of saponification of the oil also controlled.

But sodium hydroxide is extremely reactive and moreover sodium salts generally are deleterious to add to fish livers because they are strongly ionized in solution and actively coagulate the protein material and render the mixture difficult to handle. They also appear to promote the oxidation of the oil content as indicated by an enhanced tendency to darken, after separation, which is undesirable from the standpoint of appearance if not harmful from the standpoint of use.

It is accordingly an object of the present invention to provide a process which shall be applicable, not only as a complete final process upon the fish, as they are delivered on shore, but also as a preliminary treatment of the fish or fish livers, as soon as they are caught, upon the fishing vessel. It is also an object to provide a process which shall retard or prevent ancillary reactions upon the oil content or reactions upon the surrounding materials which tend to deteriorate the oil itself or form by-products which might enter into the oil and deteriorate its quality,—as by color, odor, clearness, vitamin value, and the like. It is also an object to provide a method of procedure which is applicable to the treatment of other parts of fish, such as fish meal or the press liquors therefrom, to disintegrate or dissolve the solid matter thereof and liberate the oil and promote its separation and effective recovery in pure condition. It is a further object to avoid the addition of sodium or the other alkali metal salts to the fish livers. Other objects will appear from the following disclosure.

In accordance with my United States Patent No. 2,156,985, it has been discovered by me and there disclosed that fish livers may be advantageously treated with ammonium hydroxide solution, inter alia, to disintegrate and dissolve the liver tissues and other solid matter, and promptly liberate the oil content, substantially without destruction of the oil by saponification or deterioration of the liver oil recovered,—which is light colored and remains so,—and also without any adverse actions upon the liver tissue which would present difficulties in carrying out the process.

In accordance with the present invention, it is discovered that if fish livers as removed from the fish when caught or within a reasonable length of time thereafter, are treated with a solution of ammonium borate and ammonium hydroxide,—the livers will be preserved in substantially their natural or original condition, and especially as to color, for a long time.

The oil content progressively separates from the solid liver substance during such treatment and takes place almost completely, upon long standing. Accordingly, the oil may be separated directly at this point followed by simple washing of the oil.

In a similar way, for the preservation of the livers, they may be treated with ammonium hydroxide solution alone, preferably in relatively high concentrations, and stored until such time as may be desired to recover the oil. This treatment does not keep the livers so bright in appearance as the foregoing treatment with ammonium hydroxide and ammonium borate, but the oil separates and is dark colored but clear, readily obtainable in high yields and of excellent vitamin value.

Ammonium salts of strong acids, such for example as ammonium chloride and ammonium sulphate, do not thus serve effectively to keep the livers but if added in sufficient amounts are active coagulating agents upon the protein and in various ways obstruct the subsequent separation and recovery of the oil, similar to the difficulties which are encountered with corresponding salts of sodium, as pointed out above.

On the other hand, small amounts of ammonium salts generally, including those just mentioned, may be added to aqueous suspensions or mixtures which would otherwise tend to foam, and are effective to prevent such foaming, in concentrations not greater than one or two per cent. This is a great advantage. Even ammonium soaps, in solution, are far less subject to foaming than corresponding sodium or alkali metal compounds.

It is found that fish livers, treated with solutions of ammonium hydroxide or ammonium hydroxide and ammonium borate, as above described, will keep without deterioration in quality or appearance, for several weeks or more, and in fact even for six months to a year. It is therefore clear that fish livers may be treated in this way and subsequently shipped and stored as long as is likely to be necessary or desirable, before extracting the oil from them, without loss of the oil content or deterioration in the amount and quality of the yield of oil to be obtained from them as a final product.

It is both expedient and advantageous to include in the solution of ammonium borate the additional amount of ammonium hydroxide, as above indicated. This not only fortifies the ammonium salt against any acidifying tendencies which may be present or introduced during shipping and storing but actively regenerates such ammonium buffer salt and facilitates the subsequent operations for the separation and recovery of the oil and the quantity and quality of the yields obtained.

If a concentrated ammonium hydroxide solution is used alone it is also effective to this end, and such treatment may, upon suitable occasion or with suitable apparatus, be resorted to advantageously. The principal difficulty is the practical one of the disagreeable odor of concentrated ammonia, if it should escape. With provisions of suitable automatic equipment, however, this need not occur and the treatment in this way may be perfectly well carried out to preserve the livers as the fish are caught and the livers removed therefrom on board the vessel.

It is a characteristic feature of the present procedure that by treating fish livers in any one of the ways above described, they are not only maintained in good condition and the oil content conserved and its vitamin and other desirable values protected, but they are also kept and delivered in especially favorable condition for the subsequent separation and recovery of the oil content, both conveniently and completely, and the product is not characterized by impurities nor subsequent liability to serious oxidation or darkening. These advantages are attributable to the avoidance of alkali metal compounds which the present process makes possible and to the unique characteristics of ammonia and its compounds in being especially compatible with the liver tissues and liver oil without deleterious action or effects.

Accordingly, if the livers have been given a preliminary treatment with concentrated ammonium hydroxide alone or with ammonium hydroxide plus ammonium borate, they may subsequently be simply heated, and then centrifuged to effect the ready and complete recovery of the oil therefrom, substantially in accordance with my issued patent above referred to. When ammonium hydroxide and ammonium borate are used in the preliminary treatment followed by prolonged standing or direct treatment, additional ammonium hydroxide is not usually necessary, though it may be used, in connection with the treatment for the separation of the oil.

It is to be understood that the application of the present process by treating with ammonium hydroxide and an ammonium buffering agent and then immediately treating for recovery of the oil is herein contemplated. In other words, if no interval of time needs to elapse between the preliminary treatment and the separation or recovery treatment, the process is equally feasible of carrying out, at once, for such interval is not necessary to the satisfactory operation of the process. At the same time it is fully applicable whenever it may prove to be necessary or convenient to give the livers the preliminary treatment and then delay, for shipment, storage and the like, until the time when and place where they can be conveniently rendered for recovery of the oil is reached,—even though this be a very extended period of time afterward, and after shipment for long distances.

Accordingly, the complete process herein disclosed, includes the preliminary treatment with ammonium hydroxide and ammonium borate, or ammonium hydroxide alone, and may be carried out and followed directly by the separation treatment, as by heating almost to the boiling point and separating by gravity or by passing the mixture directly through a high speed centrifuge, whereupon the clear and pure oil is separated from the remaining reagents, water and other ingredients of the mixture. This could be carried out on board the ship as the fish are caught and cleaned, if suitable facilities are provided. Or, it may be so applied to the usual run of fish livers as they are available on shore, after being kept in other ways, as by freezing and the like. In the latter case the livers are not, of course, in such good condition, and the oil content is usually already reduced not only in quantity but also in quality.

A typical instance of the practical application of the invention will be described with reference to the preliminary treatment to be followed with fish livers, as they are caught (so as to be kept until they are brought ashore) and subsequent segregation and separation of the oil content, as convenient, usually in a suitable plant, equipped for the purpose on shore.

Thus, for example, a batch of livers, as removed from the fish, was treated with about 9% by weight of a reagent solution, previously prepared, of the following composition:

Boric acid, pH value of solution 10.45 ___grams_ 40
26% aqua ammonia, pH value of livers before treatment 6.5 _____ cc__ 353
Water, pH value of livers after treatment 9.58 _____ cc__ 666

The treated batch was thoroughly mixed so as to disseminate the reagent solution throughout the charge and to contact and penetrate all of the surfaces and cavities of the liver substance. It was then covered and set aside.

At the end of a month the general appearances of the batch had not changed, although a slight separation of oil was observable.

During the second and third months, approximately one-half of the oil content had separated and collected at the top, while the solids remained of substantially the same appearance as when treated. The color of the solids was of a typical, more or less uniform pink.

At the end of six months, almost all of the oil had separated, coalesced, and risen to the top, and could have been drawn off in pure condition without further treatment. The appearance of the solids was still substantially unchanged from that of the charge as originally prepared.

The batch was then diluted with twice its volume of water and the mixture heated to 180° F. and then allowed to settle and separate. Thereupon the separated layer of oil was drawn off, giving a high yield and having good color, low free fatty acid content, unreduced vitamin value and practically permanent stability against subsequent change. The purity and stability of the oil thus recovered was demonstrated by the fact that the separated oil was perfectly clear and light in color, and, furthermore, upon keeping for two months longer, did not darken or undergo further change with age. This shows that not only was the oil substantially unaffected by the treatment but that it was left in a condition in which further change did not develop and that it was free from extraneous materials which would cause such changes in the oil or undergo such changes themselves. In short, spontaneous or uncontrolled decomposition of the livers and associated materials, which would otherwise take place, is prevented by the present process, so that only the direct preserving and subsequent disintegrating action of the reagent upon the liver tissue, etc., is effective. Since the products of such action are soluble in water, they are completely dissolved in and removed with the separated aqueous reagent solution.

If the livers are not treated at the time when the fish are caught and cleaned, but are delivered promptly or are frozen and delivered later on for processing, the same treatment may nevertheless be applied. In such case further storage and the like may be desirable, and in such event the livers may be treated by the present process and kept until a suitable time for separating the oil. Or, the livers may be treated directly by this process for the recovery of the oil content. Since the livers are not usually contacted with the reagent so long in such cases as when they have been stored for days or weeks or months (as in the event of being treated on the boat), the action of the reagent for direct oil recovery may be hastened by heating to a higher temperature or for a longer period than when employed merely to facilitate separation of the oil which has already been largely liberated from the solid tissues and cells by long standing and merely requires to be coalesced and drawn off.

The solid matter which is left undissolved is usually small in amount but it may be separated and treated with a fresh quantity of the aqueous solution of reagent, if it is thought that it still contains any residual content of oil to be liberated. Likewise the oil fraction may be washed with fresh water to dissolve any water-soluble matter which has not been retained by the reagent solution. But neither of these treatments is usually necessary.

The method of the invention may also be applied for the separation of the oil content from fish substance generally,—as in the form of fish meal for example. Ordinarily the cost of reagent and the value of the fish meal will prevent its application to the entire solid charge. On the other hand (and even more effectively) the cooked scrap may be pressed to liberate the fluid content,—consisting generally of aqueous and oily liquids together,—with a small amount of finely divided solids dispersed therein. The press liquor thus obtained is mixed with the ammoniacal reagent, per se, or a solution of the same as above described, and heated, whereupon the segregation and separation of the oil content is facilitated and an improved product obtained.

For example, a quantity of press liquor from the preparation of fish meal (which was slightly acidic, having a pH of 6.9) was treated with a quantity of the above reagent solution to make the mixture definitely alkaline,—e. g., to a pH of 9.07. It was then thoroughly mixed, heated almost to boiling, and then allowed to stand quiescent and to cool. Thereupon a good segregation and separation of oil was effected and a high yield obtained, of good quality oil, substantially free from any tendency to further decomposition.

In such operations, the presence of a large volume of water, in which the reagents are freely soluble, would lead to the consumption and loss of a large quantity of reagent, relative to the volume of oil recovered. The process may more advantageously be applied in such cases, therefore, by effecting a preliminary separation of the oily fraction of the press liquor by allowing it to stand, decanting the top portion from the lower layer of water and heavy solids,—and then treating the upper, lighter fraction, which will contain most if not substantially all of the oil content, as above described. In this way a large part of the water is disposed of without acquiring any of the reagent, while a greater concentration of the reagent solution may be advantageously applied to the more concentrated oily fraction thus separated, and the solids associated therewith, which may tend to float and become associated with it. A further step in this direction may be made by adding to such oil fraction concentrated ammonia and boric acid only,—i. e., not in the form of a solution and hence without the additional water mentioned in the above composition, or ammonium borate crystals and concentrated ammonium hydroxide,—relying upon the water content of the charge to dissolve, dilute and disperse the reagents therethrough.

As a convenient form of the reagent, ammonium acid tetra borate, which is readily available commercially may be used and it is readily water soluble, forming, per se, an alkaline solution. To such reagent, free ammonia may be added to raise the pH value of the solution and that of the charge treated therewith, as above indicated. Ammonium borate is also available in crystalline form and is useful directly as thus obtained, with suitable additional ammonium hydroxide.

Other ammonuim buffer salts of organic acids may be used which are effective to keep fish livers treated therewith in good condition for a long period of time. These are: ammonium benzoate, ammonium salicylate, ammonium boro-benzoate, ammonium boro-citrate. But these are not full equivalents of ammonium borate above described, for while they may serve to keep the livers, they severally introduce difficulties which do not attend the use of ammonium borate or ammonium hydroxide. For example, the acids of the benzoates and salicylates both tend to dissolve in the oil, while the benzoates form tan-colored compounds with iron and the salicylates give violet iron compounds. The boro-citrates tend to attack any metallic iron with which they come into contact and become discolored thereby, and the fatty acid compounds of iron cannot be readily separated. With such salts, therefore, when and if used, a preliminary addition of an excess of ammonium hydroxide is to be recommended, to avoid or prevent the presence or formation of the free acid.

I claim:

1. Method of recovering oils from fish and fish livers, comprising treating the same, in the form of an aqueous suspension or mixture, with an ammonia and a preservative reagent and permitting the same to stand for a prolonged period of time.

2. Method of recovering oils from fish and fish livers, comprising treating the same, in the form of an aqueous suspension or mixture, with an ammonium hydroxide solution and permitting the same to stand for a prolonged period of time.

3. Method of recovering oils from fish and fish livers, comprising treating the same, in the form of an aqueous suspension or mixture, with an ammonium buffer salt of a weak acid and ammonium hydroxide.

4. Method of recovering oils from fish and fish livers, comprising treating the same, in the form of an aqueous suspension or mixture, with an ammonium buffer salt of a weak acid and ammonium hydroxide, and permitting the same to stand for a prolonged period of time.

5. Method of recovering oils from fish and fish livers, comprising treating the same, in the form of an aqueous suspension or mixture, with an ammonium buffer salt of a weak acid and ammonium hydroxide, and permitting the same to stand for a prolonged period of time, and finally separating the oil.

6. Method of recovering oils from fish and fish livers, comprising treating the same, in the form of an aqueous suspension or mixture, with an ammonium salt of a weak buffer acid and ammonium hydroxide, and immediately separating the oil.

7. Method of recovering oils from fish and fish livers, comprising treating the same, in the form of an aqueous suspension or mixture, with an ammonium salt of a weak buffer acid and ammonium hydroxide, heating the mixture and separating the oil therefrom.

8. Method of recovering oils from fish and fish livers, comprising treating the same, in the form of an aqueous suspension or mixture, with ammonium borate and ammonium hydroxide.

9. Method of recovering oils from fish and fish livers, comprising treating the same, in the form of an aqueous suspension or mixture, with concentrated ammonium hydroxide solution, preserving the same during prolonged storage or shipment, and subsequently separating the oil from the remainder of the suspension or mixture.

10. Method of recovering oils from fish and fish livers, comprising treating the same, in the form of an aqueous suspension or mixture, with an ammoniacal preservative of the class consisting of concentrated ammonium hydroxide solutions, per se, and ammonium buffer salts plus ammonium hydroxide, preserving the same during prolonged storage or shipment, and subsequently separating the oil from the remainder of the suspension or mixture by heating.

11. Method of recovering oils from fish and fish livers, comprising treating the same, in the form of an aqueous suspension or mixture, with an ammoniacal preservative of the class consisting of concentrated ammonium hydroxide solutions, per se, and ammonium buffer salts plus ammonium hydroxide, preserving the same during prolonged storage or shipment, and subsequently separating the oil from the remainder of the suspension or mixture by gravity.

12. Method of recovering oils from fish and fish livers, comprising treating the same, in the form of an aqueous suspension or mixture, with an ammoniacal preservative of the class consisting of concentrated ammonium hydroxide solutions, per se, and ammonium buffer salts plus ammonium hydroxide, preserving the same during prolonged storage or shipment, and subsequently separating the oil from the remainder of the suspension or mixture by centrifuging.

13. Method of preventing foaming of aqueous suspensions or mixtures, containing fish or fish liver therein, comprising the step of treating the same with an ammonium salt of a strong highly ionized inorganic acid.

14. Fish livers preserved without substantial chemical change from their original condition in an ammoniacal preservative of the class consisting of ammonium buffer salts plus ammonium hydroxide.

15. Fish livers packed in an aqueous solution of an ammonium buffer salt of a weak acid and ammonium hydroxide and without substantial chemical change from their original condition.

16. Fish livers, preserved without substantial chemical change from their original condition in an aqueous solution of ammonium borate and ammonium hydroxide.

17. Fish livers, preserved without substantial chemical change from their original condition in a concentrated aqueous solution of ammonium hydroxide.

HERBERT HEMPEL.

CERTIFICATE OF CORRECTION.

Patent No. 2,303,740.  December 1, 1942.

HERBERT HEMPEL.

It is hereby certified that error appears in the printed specification of the above numbered patent requiring correction as follows: Page 3, first column, strike out lines 4 to 8 inclusive and insert instead the following:

-- 40 grams boric acid
333 cc. 26% aqua ammonia
666 cc. water
ph value of solution 10.45
ph value of livers before treatment 6.05
ph value of livers after treatment 9.58 --;

page 4, first column, line 33-34, claim 1, for "with an ammonia" read --with ammonia--; and that the said Letters Patent should be read with this correction therein that the same may conform to the record of the case in the Patent Office.

Signed and sealed this 26th day of January, A. D. 1943

Henry Van Arsdale,
Acting Commissioner of Patents.

(Seal)